Patented May 22, 1945

2,376,663

UNITED STATES PATENT OFFICE 2,376,663

PRODUCT APPLICABLE FOR TANNING PURPOSES

Charles Coutor, Premery, France; vested in the Alien Property Custodian

No Drawing. Application July 14, 1941, Serial No. 402,440. In France December 21, 1940

3 Claims. (Cl. 260—236)

This invention has for its chief object to provide a product capable of being used for tanning purposes where it can advantageously replace more particularly butyric acid and lactic acid in all the processes in which the said acids are generally used.

It is well known that butyric and lactic acids are used for tanning purposes in certain processes which comprise an adjustment of the pH of the tanning-liquor, such as, for example, in the operations known as restoring and pickling as well as in de-liming operations, the lactate and butyrate of calcium being soluble in water.

I have found that it is possible to use in a similar manner, and for the treatment of hides, a mixture of the water-soluble constituents of wood-tar, the said mixture being in the form of a liquid having a viscosity substantially between 0.2 and 0.5° Engler at 20° C. and a density substantially between 1.050 and 1.130, and distilling between 150° C. and 230° C. under atmospheric pressure, and having an index of saponification substantially between 350 and 500. The said mixture has chemical properties which are at the same time those of fatty acids, having small quantities of stable internal or external esters and of the salts of pyridic or quinoleic bases. It gives, with alkaline and alkaline-earth bases, salts which are soluble in water and it possesses a total acidity one half of which is saturated in the cold and the other half at ebullition by the solutions of alkaline carbonates. In a like manner, the acidity which is indicated by phenolphthalein forms only from 40 to 50% of the acidity which can be used, the latter being given by the index of saponification.

The said mixture of water-soluble constituents of wood-tar can be obtained according to the invention either by starting from wood-tar or from creosote oils, the latter themselves being obtained through a distillation of the tar, or by starting from the pyroligneous liquor resulting from the distillation of wood.

In the first method one proceeds by treating the wood-tar, or the heavy creosote oils resulting from the distillation of the said tar, with water, for instance with 3 to 15 volumes of water, in liquid phase, acetic acid or methyl alcohol or a mixture of acetic acid and methyl alcohol being eventually added to the water, after which the product is separated from its aqueous solution by distillation of the water of the solution or by extracting it with a solvent having a low boiling point and being not miscible with water, as for instance ether, benzene, ethyl acetate, methyl acetate, methyl propionate, light wood-oils, followed by the distillation of the solvent.

The washing water used for washing the tar or the creosote oils dissolves a small quantity of the other constituents of the tar (phenols, phenol esters, carbides and the like) together with the water-soluble constituents of the tar. Since the said other constituents can prove troublesome in tanning, it is generally advisable to remove them from the solution before the latter is concentrated in the above mentioned manner. To this end, the said impurities are removed by a suitable solvent used in convenient proportions: (ether, benzene, ethyl acetate, methyl acetate, methyl propionate, light wood-oils) according to a technique which is known per se and which eventually comprises a final distillation of the solvent.

This solvent also dissolves, together with the impurities, a small quantity of the water-soluble constituents which it is desired to obtain, but the latter can be recovered. In order to effect this recovery, the residue which remains after the distillation of the solvent is added to the tar or to the creosote oils which have not yet been treated.

In the second method the pyroligneous liquor is preferably entirely distilled and subjected to the same process as in the first method, but it is then more particularly advisable to effect the purification through a partial extraction by a solvent before proceeding with the distillation of the water or with the complete extraction of the water-soluble constituents by a solvent.

It is to be noted that, in this second method, the acetic acid of the pyroligneous liquor is generally obtained mixed with the product which it is desired to obtain, but this can be avoided by using, for the extraction, a solvent which dissolves very little acetic acid, such as, for example, benzene, toluene or xylene. Otherwise, it is comparatively easy to separate the acetic acid by distillation, since the said acid has a boiling point of 118° C., while the products which are to be separated go off between 150° C. and 230° C.

The pyroligneous liquor can also be treated without being redistilled provided, however, that the main tar has been previously separated by decantation. The mixture so obtained by the treatment of the decanted pyroligneous liquor, as above described for the re-distilled pyroligneous liquor, must be rectified by distillation in vacuo or at atmospheric pressure, in order to separate therefrom, as a product to be collected, the fraction which goes off between 150° C. and 250° C. under atmospheric pressure, this rectification being practically superfluous when re-distilled pyroligneous liquor has been treated.

In both cases a commercial product is obtained which can be used for tanning purposes.

The fact that the acidity of the components of this mixture is not entirely free but is, in large part, capable of reacting with substances having a pH of more than 8, allows the mixtures in question to be advantageously used for tanning purposes in the different steps of processing where the pH of the tanning liquors must be adjusted, as, for instance, in restoring, de-liming, pickling, swelling operations, as well as in tanning in color pits or refreshing.

For these purposes the product according to the invention advantageously replaces butyric and lactic acids, the so obtained leathers having a better feel, a fair grain and a lighter colour with a smell not unlike that of leathers which have been tanned very slowly.

Two examples corresponding, one to the treatment of the tar or of creosote oils, and the other to the treatment of the decanted pyroligneous liquor may be cited by way of nonlimitative illustrations of execution of the manufacturing process which also forms a subject matter of the invention.

First example

Hard wood creosote oils going off by distillation between 150° C. and 230° C. are put through an apparatus of the usual type for the treatment of liquid in counter-current with water at 40° C. in the proportion of 7 volumes for 1 volume of oil. Under these conditions the oils remain heavy with respect to the water and about 50% of the oils are recovered as a residue of the washing with water. The washing water is treated in a counter-current apparatus with cold benzene in the proportion of 10% of benzene with respect to the water. The so obtained benzenic extract is distilled for recovering the benzene which is collected below 100° C. The residue, which represents about 10% of the initial oils, is added to the next fraction of creosote oils to be treated.

The so purified washing water is treated in a counter-current apparatus with cold benzene in the proportion of 200% of benzene with respect to the water, the exhausted water is thrown away and the benzenic extract is distilled for recovering the benzene which distils below 100° C. The residue of this distillation constitutes the mixture of the water-soluble substances of the treated creosote oils and represents the commercial product which can be used for tanning purposes.

Second example

Pyroligneous liquor assaying about 10% of acetic acid is distilled. One collects separately, on the one hand, the main products which contain the methyl alcohol and the other products which go off above 100° C. and, on the other hand, all the rest of the liquor which distils up to a temperature of 120 to 130° C.

The second fraction of the distilled liquor is treated in a counter-current apparatus with one quarter of volume of ethyl acetate and the extract is distilled to recover, below 100° C., the ethyl acetate, the residue of the distillation being added to the next fraction of pyroligneous liquor to be treated.

The second fraction of the distilled pyroligneous liquor which has been thus partially treated with one quarter of volume of ethyl acetate is then treated in the same conditions with two volumes of ethyl acetate. The aqueous layer which has been separated after this operation is exhausted in dissolved ethyl acetate by a partial distillation and thrown away, while the mixture of products extracted by the ethyl acetate is rectified by distillation in order to separate, first, at about 70° C., the ethyl acetate which will be used for a further operation and, next, between 100 and 118° C., the acetic acid. The residue of the distillation constitutes the mixture of the water-soluble substances which it is desired to obtain and represents the commercial product which can be used for tanning purposes.

What I claim is:

1. As a commercial product for the treatment of hides for tanning purposes, a mixture of the water-soluble constituents of wood-tar having a viscosity substantially between 0.2 and 0.5 Engler at 20° C. and a density substantially between 1.03 and 1.13, distilling between 150 and 230° C. having an index of saponification substantially between 350 and 500, showing at the same time the chemical properties of fatty acids, having small quantities of the group consisting of stable internal and external esters and of the group consisting of salts of pyridic and quinoleic bases.

2. A method for the recovery of a mixture of water soluble constitutents, used for the treatment of hides, from pyroligneous liquor from the distillation of wood, which comprises distilling said pyroligneous liquor, collecting that which distills between 120° C. and 130° C., extracting said fraction with a weak solution of a non-water miscible solvent of low boiling point producing an extract and a residual liquid, extracting the residual liquid with a stronger solution of said solvent producing an extract and a residual liquid, distilling said last named extract at a temperature of 110° C. the residual liquid of said distillation constituting the water-soluble substances suitable for tanning purposes.

3. A method for the recovery of a mixture of water soluble constituents, used for the treatment of hides, from pyroligneous liquor from the distillation of wood, which comprises distilling said pyroligneous liquor collecting separately the distillate that goes off below 120° and that which distills up to 130° C., extracting the second fraction with a weaker solution of a non-water miscible solvent of low boiling point obtaining an extract and a residual liquid, distilling off the solvent from the extract at a temperature below 100° C. and leaving a residual liquid, adding this residual liquid to a new fraction of liquid to be initially distilled, extracting the residual liquid of the first distillation with a stronger solution of said solvent, discarding the aqueous layer of this operation after extraction with the solvent rectifying by distillation the extract of the second distillation, collecting the distillate passing over up to 70° C. for the solvent, next collecting the distillate going over between 100° and 110° for acetic acid leaving a residual liquid constituting the water-soluble substances suitable for tanning purposes.

CHARLES COUTOR.